US010381047B2

(12) United States Patent
Chen

(10) Patent No.: US 10,381,047 B2
(45) Date of Patent: Aug. 13, 2019

(54) METHOD, DEVICE, AND SYSTEM OF SYNCHRONOUSLY PLAYING MEDIA FILE

(71) Applicant: GUANG DONG OPPO MOBILE TELECOMMUNICATIONS CORP., LTD., Dongguan, Guangdong (CN)

(72) Inventor: Yong Chen, Dongguan (CN)

(73) Assignee: GUANG DONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 96 days.

(21) Appl. No.: 15/191,523

(22) Filed: Jun. 24, 2016

(65) Prior Publication Data
US 2016/0307605 A1    Oct. 20, 2016

Related U.S. Application Data

(63) Continuation of application No. PCT/CN2015/095692, filed on Nov. 26, 2015.

(30) Foreign Application Priority Data

Feb. 13, 2015  (CN) .......................... 2015 1 0081196

(51) Int. Cl.
*G11B 27/34*    (2006.01)
*G11B 27/00*    (2006.01)
(Continued)

(52) U.S. Cl.
CPC ............ *G11B 27/34* (2013.01); *G11B 27/007* (2013.01); *G11B 27/10* (2013.01); *G11B 27/102* (2013.01);
(Continued)

(58) Field of Classification Search
CPC ....... G11B 27/34; G11B 27/007; G11B 27/10; G11B 27/102; H04N 21/41407;
(Continued)

(56) References Cited

U.S. PATENT DOCUMENTS

2007/0294622 A1* 12/2007 Sterner ................. G06Q 30/00
                                                                      715/716
2008/0195746 A1*  8/2008 Bowra ................ H04L 12/2805
                                                                      709/231

(Continued)

FOREIGN PATENT DOCUMENTS

CN            103248931 A       8/2013
CN            103475917 A      12/2013
(Continued)

*Primary Examiner* — Thai Q Tran
*Assistant Examiner* — Sunghyoun Park
(74) *Attorney, Agent, or Firm* — Hodgson Russ LLP

(57) ABSTRACT

The present disclosure proposes a method of synchronously playing media file. The method includes: receiving, with a mobile terminal, parameter information from a playing device, the parameter information including a current playing progress and a total time length of a current playing media file; starting to count time, with the mobile terminal, upon receiving the parameter information and calculating, with the mobile terminal, a real-time playing progress of the media file based on a predetermined time interval according to the parameter information and timing information; displaying, with the mobile terminal, the real-time playing progress on a display interface. The present disclosure solves unstable data transmission and enhances the accuracy of displaying progress of the playing device.

19 Claims, 8 Drawing Sheets

(51) Int. Cl.
*G11B 27/10* (2006.01)
*H04N 21/414* (2011.01)
*H04N 21/43* (2011.01)
*H04N 21/472* (2011.01)
*H04N 21/436* (2011.01)

(52) U.S. Cl.
CPC ... *H04N 21/41407* (2013.01); *H04N 21/4302* (2013.01); *H04N 21/4307* (2013.01); *H04N 21/43615* (2013.01); *H04N 21/47217* (2013.01)

(58) Field of Classification Search
CPC .......... H04N 21/4302; H04N 21/4307; H04N 21/43615; H04N 21/47217
See application file for complete search history.

(56) References Cited

U.S. PATENT DOCUMENTS

| | | | |
|---|---|---|---|
| 2011/0107379 A1* | 5/2011 | Lajoie | H04L 65/1016 725/87 |
| 2011/0205427 A1* | 8/2011 | Wang | G10L 21/04 348/441 |
| 2012/0081287 A1* | 4/2012 | Kim | G06F 9/44 345/168 |
| 2013/0165164 A1 | 6/2013 | Rowe | |
| 2013/0208192 A1 | 8/2013 | Zhang | |
| 2013/0227414 A1* | 8/2013 | Hwang | G06F 3/0485 715/719 |
| 2013/0238740 A1* | 9/2013 | Vass | G06F 17/30902 709/213 |
| 2014/0095965 A1* | 4/2014 | Li | G11B 27/10 715/203 |
| 2014/0118625 A1 | 5/2014 | Cho | |
| 2014/0123182 A1 | 5/2014 | Lee et al. | |
| 2016/0307605 A1 | 10/2016 | Chen | |

FOREIGN PATENT DOCUMENTS

| | | |
|---|---|---|
| CN | 103517089 A | 1/2014 |
| CN | 103747366 A | 4/2014 |
| CN | 104244110 A | 12/2014 |
| CN | 104703036 A | 6/2015 |

* cited by examiner

METHOD, DEVICE, AND SYSTEM OF SYNCHRONOUSLY PLAYING MEDIA FILE

CROSS REFERENCE TO RELATED APPLICATION

This application is a continuation of International Application No. PCT/CN2015/095692, filed on Nov. 26, 2015, which claims priority to Chinese patent application No. 201510081196.6, filed on Feb. 13, 2015, the content of which are incorporated herein by reference in their entirety.

BACKGROUND OF THE DISCLOSURE

1. Field of the Disclosure

The present disclosure relates to the electronic technology, and more particularly, to a method of synchronously playing media file, a device of synchronously playing media file, and a system of synchronously playing media file.

2. Description of the Related Art

With the development of mobile terminal technology, mobile terminals, such as smart cellphones and tablet computers, have more and more functions. In at least one embodiment, a playing device, a washing machine, or a television can be controlled by a mobile terminal.

Nowadays, a conventional method of displaying a playing progress of media file played by a playing device is that a mobile terminal sends a request of acquiring a current playing time of media file to a playing device through the Internet (in at least one embodiment, sends a request of acquiring a current playing time to a playing device every one minute) to confirm the current playing time. However, provided that the Internet speed is poor with the method, message delay or even packet loss may occur when frequent message transmission among the devices. Thereby, the unstable display or jitters of the playing time progress affect the stability of data transmission.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

Figure 1:
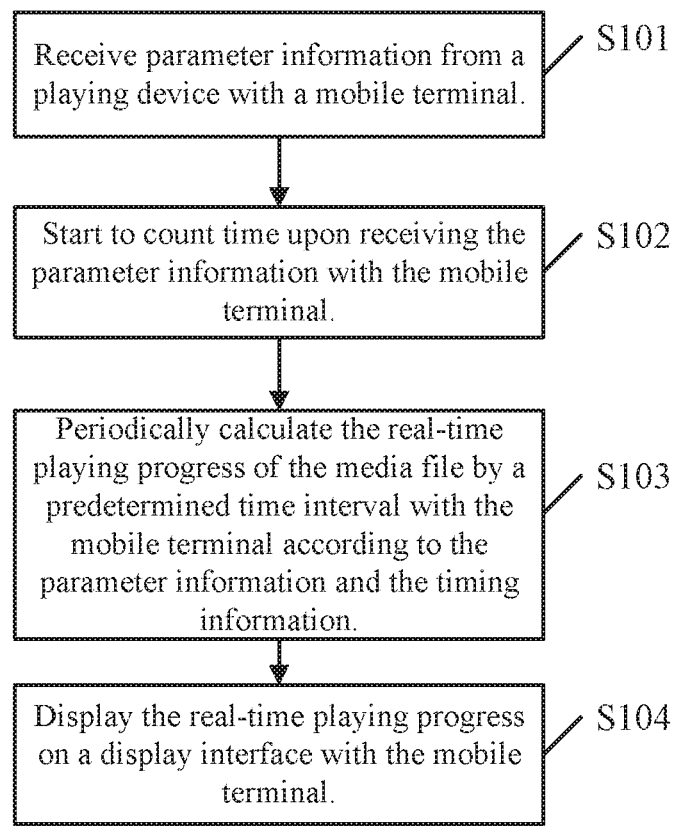
FIG. 1 shows a flowchart of a method of synchronously playing media file according to a first embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Each of the embodiments of the present disclosure proposes a method of displaying a playing progress of media file, a device of the media file, and a system of the media file in order to solve unstable data transmission and enhance the accuracy of displaying progress of playing device.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the invention.

Terms, used in the specifications, the claims, and the figures in the present disclosure, such as first, second, third, and fourth, are used to distinguish one item from another instead of specifying a certain sequence. In addition, terms, such as include, contain, consist of, etc., are intended to cover non-exclusive similar terms. In at least one embodiment, the present disclosure includes a series of blocks, the process of units, methods, systems, products, or devices which may include unlisted blocks or units. In at least one embodiment, the present disclosure includes unlisted blocks or units. Or in at least one embodiment, the present disclosure further includes other inherent blocks or units for the process of units, the methods, the systems, the products, or the devices.

Mobile terminal in the disclosure can be a cellphone, a tablet computer (PAD), a notebook computer, a palm computer, a mobile internet device (MID), a wearable device (such as a smartwatch like iwatch, a smart bracelet, and a pedometer), and other terminal devices equipped with instant messaging application client. The disclosed is not intended to limit the scope of the mobile terminal.

Playing device in the present disclosure can be a mobile terminal, a speaker, a blue-ray playing device, or any other devices capable of playing media file. The disclosed is not intended to limit the scope of the playing device.

A display method of playing media file is proposed according to an embodiment of the present disclosure. The method of playing media file includes the followings. The mobile terminal receives parameter information from the playing device. In at least one embodiment, the parameter information includes a current playing progress and a total time length of the current playing media file of the playing device. The current playing progress of the media file is calculated by the mobile terminal based on the predetermined time interval according to the parameter information and the timing information after the mobile terminal receives the parameter information and starts to count time. The current playing progress is displayed on the display interface of the mobile terminal.

Please refer to FIG. 1 which shows a flowchart of a method of synchronously playing media file according to a first embodiment of the present disclosure. The method of synchronously playing media file includes block S101 to block S103 as follows.

At block S101, a mobile terminal receives parameter information from a playing device.

In at least one embodiment, the mobile terminal sends an acquiring request of acquiring the parameter information of the current playing media file to the playing device. The playing device acquires the parameter information of the current playing media file of the playing device and sends the parameter information to the mobile terminal in response to the acquiring request from the mobile terminal. Afterwards, the mobile terminal receives the parameter information from the playing device. The parameter information includes the current playing progress and the total time length of the current playing media file of the playing device.

The parameter information further includes the information of the playing media file (such as type of the file, title of the file, lyrics, release time, size of the file, resolution, and album), the information of the playing status (such as pause, play, fast-forward, and fast-backward), and the information of the playing mode (such as sequence, random, circulation, and single circulation) in addition to the current playing progress and the total time length of the current playing media file of the playing device.

The media file includes an audio file, a video file, and so on.

At block S102, the mobile terminal starts to count time upon receiving the parameter information.

In at least one embodiment, the mobile terminal receives the parameter information and enables a timer in the mobile terminal to count time.

At block S103, the mobile terminal periodically calculates the real-time playing progress of the media file by a predetermined time interval according to the parameter information and the timing information.

In at least one embodiment, the current playing time in the current playing progress of the current playing media file of the playing device is set as a beginning time, and the total time length minus current playing time of the current playing media file is set as an ending time through the timer in the mobile terminal. Afterwards, the mobile terminal periodically calculates the real-time playing progress of the media file by the predetermined time interval according to the timing information.

The predetermined time interval is set as 30 milliseconds (ms), 50 milliseconds, one second (s), two seconds, or other values.

At block S104, the mobile terminal displays the real-time playing progress on a display interface.

In at least one embodiment, the display interface of the mobile terminal includes a playing control interface of the real-time playing progress. The playing control interface further includes a pause/play button, a fast-forward/fast-backward button, a previous/next one button, etc.

As can be seen from the above, the playing device sends the parameter information to the mobile terminal in this embodiment of the present disclosure. The mobile terminal starts to count time upon receiving the parameter information. The mobile terminal periodically calculates the real-time playing progress of the media file by the predetermined time interval according to the parameter information and the timing information, and displays the real-time playing progress on the display interface. In this way, unstable data transmission is solved, and the accuracy of displaying progress of playing device is improved as well.

In at least one embodiment, before receiving the parameter information from the playing device, the mobile terminal sends a connection request to the playing device. Afterwards, the playing device sends a complete response, which indicates a completion of a connection between the playing device and the mobile terminal, to the mobile terminal in response to the connection request sent from the playing device to the mobile terminal.

In at least one embodiment, after the real-time playing progress is displayed on the display interface of the mobile terminal, the mobile terminal receives a first touch command once the user triggers the pause button on the playing control interface. Afterwards, the mobile terminal receives the pause command. The mobile terminal sends the pause command of stopping playing the media file to the playing device so that the playing device can stop playing the media file in response to the pause command.

In at least one embodiment, after the mobile terminal sends the pause command of stopping playing the media file to the playing device, the playing device stops playing the media file in response to the pause command of stopping playing the media file from the mobile terminal. The playing device sends a pause playing status of the media file to the mobile terminal. Afterwards, the mobile terminal stops counting time upon receiving the pause playing status to ensure that a first real-time playing progress displayed on the display interface of the mobile device synchronizes with the current playing progress of the current playing media file of the playing device.

In at least one embodiment, after the real-time playing progress is displayed on the display interface of the mobile terminal, the mobile terminal receives a second touch command of the fast-forward/fast-backward button once the user triggers the fast-forward/fast-backward button on the playing control interface. Afterwards, the mobile terminal receives the fast-forward/fast-backward command. The mobile terminal sends the fast-forward/fast-backward command of fast-forwarding/fast-reversing the media file to the playing device so that the playing device, in response to the fast-forward/fast-backward command, can play the media file according to the predetermined fast-forward/fast-backward strategy.

The predetermined fast-forward/fast-backward strategy is, in at least one embodiment, to skip once every five seconds, to skip once every ten seconds, to skip once every thirty seconds, etc.

In at least one embodiment, after the mobile terminal sends the fast-forward/fast-backward command of fast-forwarding/fast-reversing the media file to the playing device, the playing device plays the media file according to the predetermined fast-forward/fast-backward strategy, and sends the fast-forwarding/fast-reversing status of the media file to the mobile terminal. Afterwards, the mobile terminal receives the fast-forwarding/fast-reversing status of the media file from the playing device. The mobile terminal starts to count time upon receiving the fast-forwarding/fast-reversing status according to the predetermined fast-forward/fast-backward strategy to ensure that the first real-time playing progress displayed on the display interface of the mobile device synchronizes with the current playing progress of the current playing media file of the playing device.

In at least one embodiment, after the real-time playing progress is displayed on the display interface of the mobile terminal, the mobile terminal receives a third touch command of the previous/next one button once the user triggers the previous/next one button on the playing control interface. Afterwards, the mobile terminal receives the previous/ next file command. The mobile terminal sends the playing command of playing the previous/next media file to the playing device so that the playing device can play the previous/next media file in response to the playing command of playing the previous/next media file.

Figure 2:
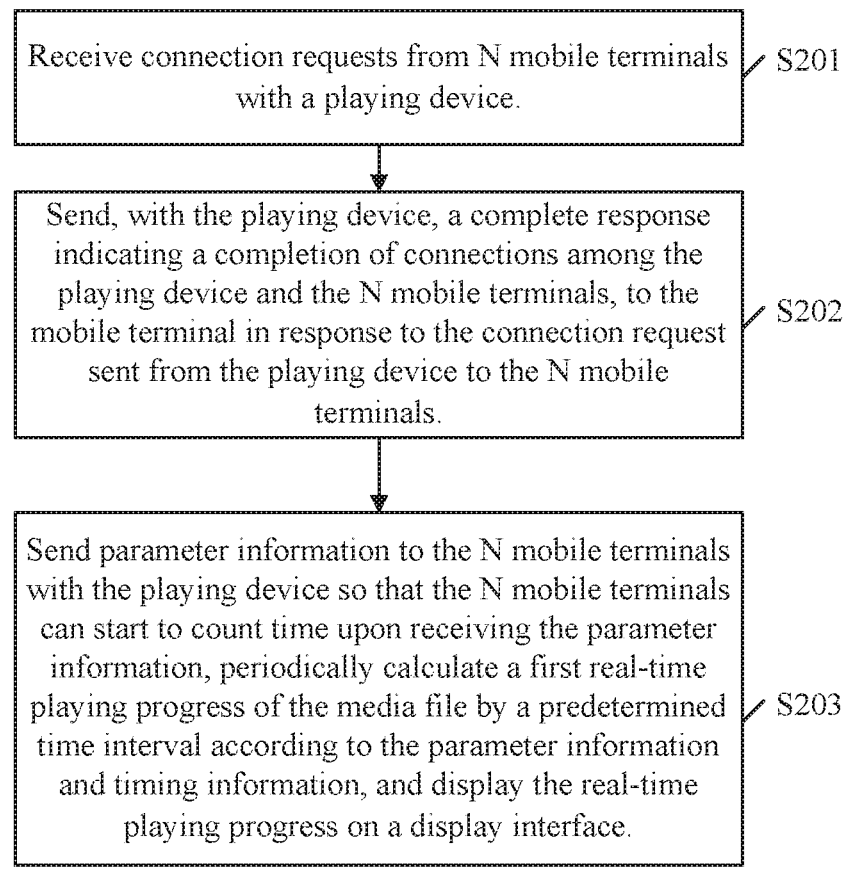
FIG. 2 is a flowchart of a method of synchronously playing media file according to the second embodiment of the present disclosure.
Figure 3:
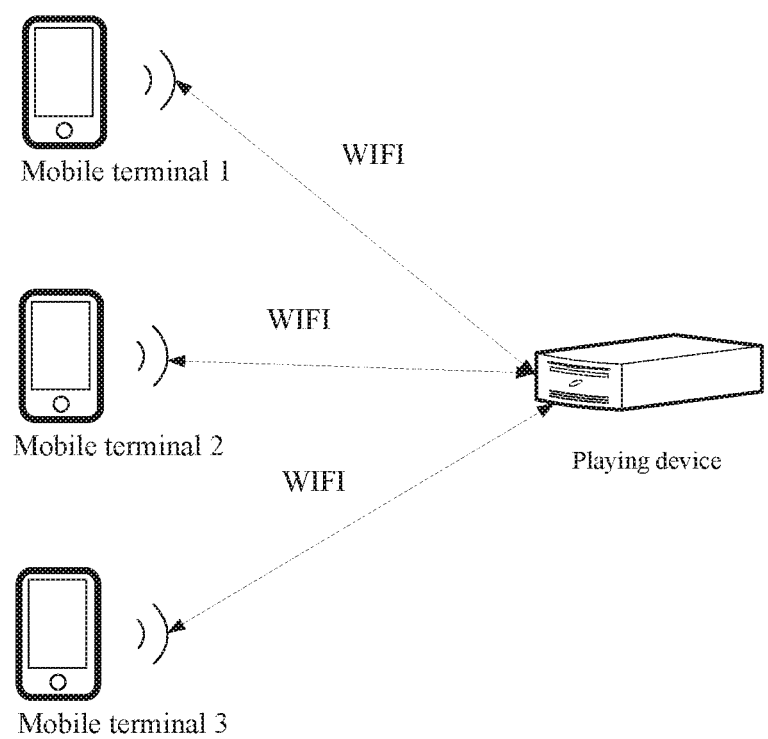
FIG. 3 is a schematic diagram of the network structure of synchronously playing media file according to a second embodiment of the present disclosure.

FIG. 3 is a schematic diagram of the network structure of synchronously playing media file according to a second embodiment of the present disclosure. In FIG. 3, a plurality of mobile terminals are connected to a playing device through the network (including but not being limited to wireless connection such as Wi-Fi or wired connection). In at least one embodiment, the plurality of mobile terminals and the playing device respectively enter a local area network (LAN) where a wireless router is through Wi-Fi. The plurality of mobile terminals are communicatively connected to the playing device through the wireless network. FIG. 2 is a flowchart of a method of synchronously playing media file according to the second embodiment of the present disclosure. The method of synchronously playing media file according to the second embodiment of the present disclosure includes following blocks:

At block S201, a playing device receives connection requests from N mobile terminals. In at least one embodiment, N represents an integer larger than or equal to one.

At block S202, the playing device sends a complete response, indicating a completion of connections among the playing device and the N mobile terminals, to the mobile terminals in response to the connection request sent from the playing device to the N mobile terminals.

At block S203, the playing device sends parameter information to the N mobile terminals so that the N mobile terminals can start to count time upon receiving the parameter information, periodically calculate a first real-time playing progress of the media file by a predetermined time interval according to the parameter information and timing information, and display the real-time playing progress on a display interface.

The parameter information includes the current playing progress and the total time length of the current playing media file of the playing device. N represents an integer larger than or equal to one.

The predetermined time interval is set as 30 milliseconds (ms), 50 milliseconds, one second (s), two seconds, or other values.

In at least one embodiment, after sending the parameter information to the N mobile terminals, the playing device receives a pause command of stopping playing the media file from one of the N mobile terminals. The playing device stops playing the media file in response to the pause command.

In at least one embodiment, after the playing device stops playing the media file in response to the pause command, the playing device sends the pause playing status of the media file to the N mobile terminals. Afterwards, the N mobile terminals stop counting time upon receiving the pause playing status to ensure that the first real-time playing progress displayed on the display interface of the mobile device synchronizes with the current playing progress of the current playing media file of the playing device.

In at least one embodiment, after sending the parameter information to the N mobile terminals, the playing device receives a fast-forward/fast-backward command of fast-forwarding/fast-reversing the playing media file from one of the N mobile terminals. The playing device plays the media file according to the predetermined fast-forward/fast-backward strategy in response to the fast-forward/fast-backward command.

The predetermined fast-forward/fast-backward strategy is, in at least one embodiment, to skip once every five seconds, to skip once every ten seconds, to skip once every thirty seconds, etc.

In at least one embodiment, the playing device sends the fast-forwarding/fast-reversing status of the media file to the N mobile terminals after the playing device, in response to the fast-forward/fast-backward command, plays the media file according to the predetermined fast-forward/fast-backward strategy so that the N mobile terminals can start to count time upon receiving the fast-forwarding/fast-reversing status according to the predetermined fast-forward/fast-backward strategy to ensure that the first real-time playing progress displayed on the display interface of the mobile device synchronizes with the current playing progress of the current playing media file of the playing device.

In at least one embodiment, after sending the parameter information to the N mobile terminals, the playing device receives a playing command of playing the previous/next media file from one of the N mobile terminals. The playing device plays the media file in response to the playing command.

As can be seen from the above, the playing device sends the parameter information to the N mobile terminals in this embodiment of the present disclosure. The N mobile terminals start to count time upon receiving the parameter information. The N mobile terminals calculate the first real-time playing progress of the media file based on the predetermined time interval according to the parameter information and the timing information, and display the real-time playing progress on the display interface. The parameter information includes the current playing progress and the total time length of the current playing media file of the playing device. N represents an integer larger than or equal to one. In this way, unstable data transmission is solved, and the accuracy of displaying progress of playing device is improved as well.

Figure 4:
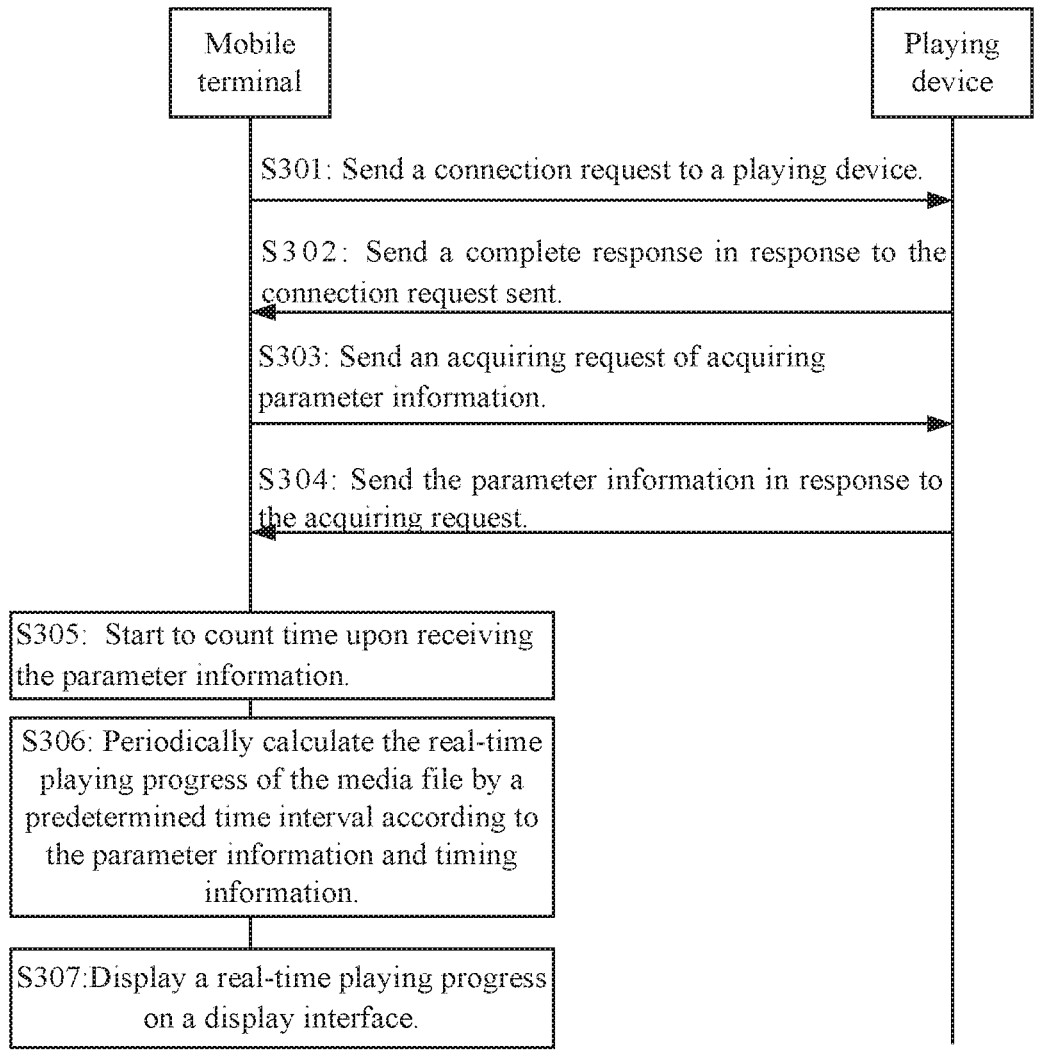
FIG. 4 is a flowchart of a method of synchronously playing media file according to a third embodiment of the present disclosure.
Figure 5:
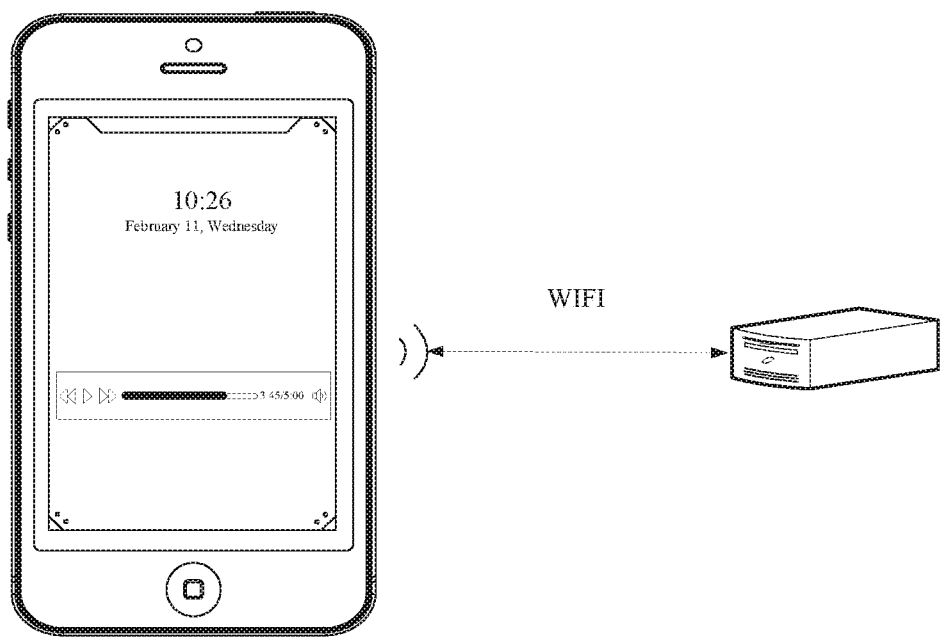
FIG. 5 is a scenario diagram of synchronously playing media file according to the third embodiment of the present disclosure.

FIG. 5 is a scenario diagram of synchronously playing media file according to a third embodiment of the present disclosure. In FIG. 5, a mobile terminal is connected to a playing device through the network (including but not being limited to wireless or wired connection such as Wi-Fi). Please refer to FIG. 4 as well. FIG. 4 is a flowchart of a method of synchronously playing media file according to the third embodiment of the present disclosure. The method of synchronously playing media file according to the third embodiment of the present disclosure includes following blocks:

At block S301, a mobile terminal sends a connection request to a playing device.

At block S302, the playing device sends a complete response, indicating a completion of a connection between the playing device and the mobile terminal, to the mobile terminal in response to the connection request sent from the playing device to the mobile terminal.

At block S303, the mobile terminal sends an acquiring request of acquiring parameter information of current playing media file to the playing device.

At block S304, the playing device sends the parameter information of the current playing media file of the playing device to the mobile terminal in response to the acquiring request from the mobile terminal.

At block S305, the mobile terminal starts to count time upon receiving the parameter information.

At block S306, the mobile terminal periodically calculates the real-time playing progress of the media file by a predetermined time interval according to the parameter information and timing information.

The predetermined time interval is set as 30 milliseconds (ms), 50 milliseconds, one second (s), two seconds, or other values.

At block S307, the mobile terminal displays a real-time playing progress on a display interface.

The display interface of the mobile terminal includes a playing control interface for showing the real-time playing progress.

In at least one embodiment, the user triggers the pause button on the playing control interface with a gesture. Afterwards, the mobile terminal receives the pause command. The mobile terminal sends the pause command of stopping playing the media file to the playing device. The playing device stops playing the media file in response to the pause command. The playing device sends the pause playing status of the media file to the mobile terminal. Afterwards, the mobile terminal stops counting time upon receiving the pause playing status to ensure that the first real-time playing progress displayed on the display interface of the mobile device synchronizes with the current playing progress of the current playing media file of the playing device.

In at least one embodiment, the user triggers the fast-forward/fast-backward button on the playing control interface with a gesture so that the mobile terminal can receive the fast-forward/fast-backward command. The mobile terminal sends the fast-forward/fast-backward command of fast-forwarding/fast-reversing the media file to the playing device. The playing device plays the media file according to the predetermined fast-forward/fast-backward strategy in response to the fast-forward/fast-backward command. The playing device sends the fast-forwarding/fast-reversing status of the media file to the mobile terminal. Afterwards, the mobile terminal receives the fast-forwarding/fast-reversing status of the media file from the playing device. The mobile terminal starts to count time upon receiving the fast-forwarding/fast-reversing status according to the predetermined fast-forward/fast-backward strategy to ensure that the first real-time playing progress displayed on the display interface of the mobile device synchronizes with the current playing progress of the current playing media file of the playing device.

The predetermined fast-forward/fast-backward strategy is, in at least one embodiment, to skip once every five seconds, to skip once every ten seconds, to skip once every thirty seconds, etc.

In at least one embodiment, the user triggers the previous/next one button on the playing control interface with a gesture. Afterwards, the mobile terminal receives the previous/next file command. The mobile terminal sends the playing command of playing the previous/next media file to the playing device. The playing device plays the previous/next media file in response to the playing command.

As can be seen from the above, after the mobile terminal is connected to the playing device, the mobile terminal sends an acquiring request of acquiring the parameter information of the current playing media file to the playing device. Then, the mobile terminal receives the parameter information from the playing device. The mobile terminal starts to count time upon receiving the parameter information. The real-time playing progress of the media file is periodically calculated with the mobile terminal by the predetermined time interval according to the parameter information and the timing information. The real-time playing progress is displayed on the display interface of the mobile terminal. In this way, unstable data transmission is solved, and the accuracy of displaying progress of playing device is improved as well.

Figure 6:
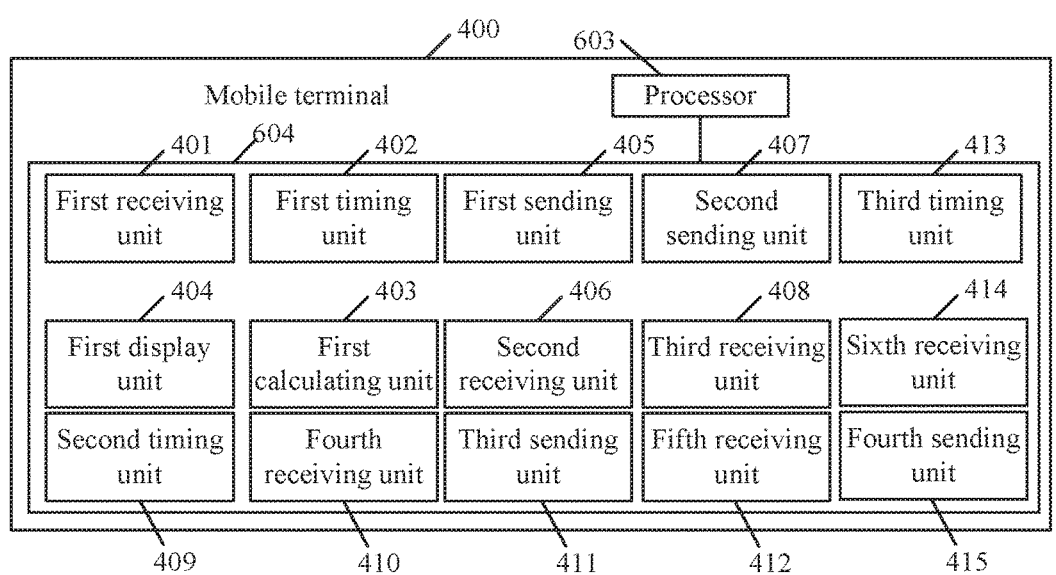
FIG. 6 is a block diagram of a mobile terminal according to the first embodiment of the present disclosure.
Figure 7:
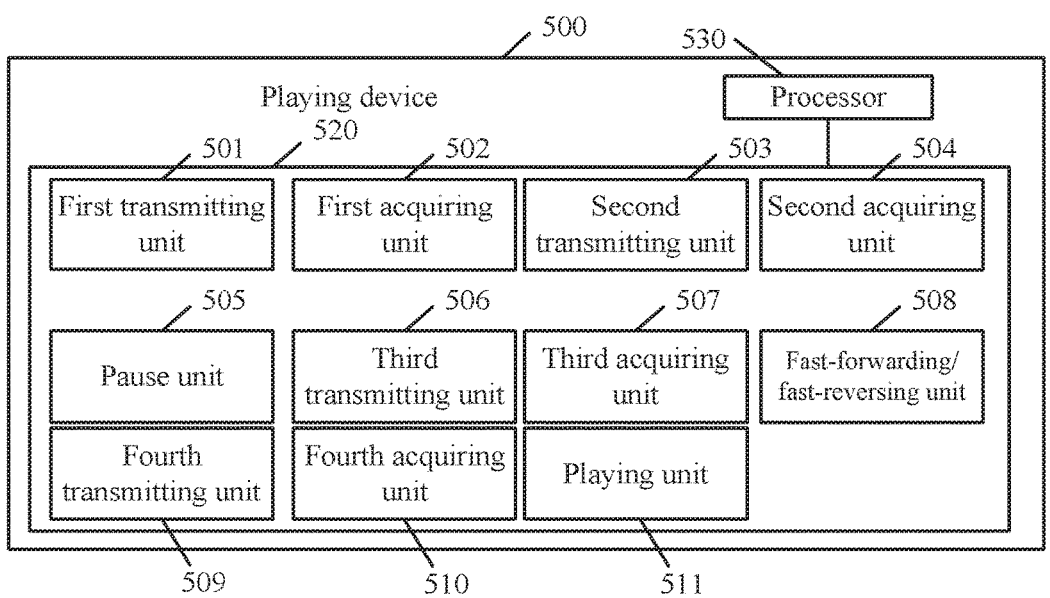
FIG. 7 is a block diagram of a playing device according to an embodiment of the present disclosure.

Please refer to FIGS. 6 and 7. FIG. 6 is a block diagram of a mobile terminal 400 according to the first embodiment of the present disclosure. FIG. 7 is a block diagram of a playing device 500 according to the first embodiment of the present disclosure. The mobile terminal 400 includes a processor 603 and a memory 604 electrically connected to the processor 603. A plurality of program instructions stored in the memory 604 are executable by the processor 603 to cause the processor 603 to perform corresponding functions. The plurality of program instructions include the following units 401-415.

A first receiving unit 401 is configured to cause the processor 603 to receive the parameter information from the playing device 500. The parameter information includes a current playing progress and a total time length of a current playing media file of the playing device 500.

A first timing unit 402 is configured to cause the processor 603 to start to count time upon receiving the parameter information by the first receiving unit 401.

A first calculating unit 403 is configured to cause the processor 603 to periodically calculate the real-time playing progress of the media file by a predetermined time interval according to the parameter information and the timing information.

The predetermined time interval is set as 30 milliseconds (ms), 50 milliseconds, one second (s), two seconds, or other values.

A first display unit 404 is configured to cause the processor 603 to display the real-time playing progress periodically calculated by the first calculating unit 403 on the display interface.

In at least one embodiment, before the first receiving unit 401 receives the parameter information from the playing device 500, the mobile terminal further includes a first sending unit 405. The first sending unit 405 is configured to cause the processor 603 to send a connection request to the playing device 500. The playing device 500 sends a complete response indicating a completion of a connection between the playing device 500 and the mobile terminal, to the mobile terminal in response to the connection request sent the mobile terminal to the playing device 500.

In at least one embodiment, after the first display unit 404 displays the real-time playing progress periodically calculated by the first calculating unit 403 on the display interface, the mobile terminal further includes a second receiving unit 406 and a second sending unit 407. The second receiving unit 406 is configured to cause the processor 603 to receive the pause command. The second sending unit 407 is configured to cause the processor 603 to send the pause command of stopping playing the media file to the playing device 500 so that the playing device 500 can stop playing the media file in response to the pause command.

In at least one embodiment, after the second sending unit 407 sends the pause command of stopping playing the media file to the playing device 500, the mobile terminal 400 further includes a third receiving unit 408 and a second timing unit 409. The third receiving unit 408 is configured to cause the processor 603 to receive the pause playing status of the media file from the playing device 500. The second timing unit 409 is configured to cause the processor 603 to stop counting time upon receiving the pause playing status from the third receiving unit. It makes sure that the first real-time playing progress displayed on the display interface of the mobile device synchronizes with the current playing progress of the current playing media file of the playing device 500.

In at least one embodiment, after the first display unit 404 displays the real-time playing progress periodically calculated by the first calculating unit 403 on the display interface, the mobile terminal 400 further includes a fourth receiving unit 410 and a third sending unit 411. The fourth receiving unit 410 is configured to cause the processor 603 to receive the fast-forward/fast-backward command. The third sending unit 411 is configured to cause the processor 603 to send the fast-forward/fast-backward command of fast-forwarding/fast-reversing the media file to the playing device 500. It makes sure that the playing device 500 plays the media file according to the predetermined fast-forward/fast-backward strategy in response to the fast-forward/fast-backward command.

In at least one embodiment, after the third sending unit 411 sends the fast-forward/fast-backward command of fast-forwarding/fast-reversing the media file to the playing device 500, the mobile terminal 400 further includes a fifth receiving unit 412 and a third timing unit 413. The fifth receiving unit is configured to cause the processor 603 to receive the fast-forwarding/fast-reversing status of the media file from the playing device 500. The third timing unit 413 is configured to cause the processor 603 to start to count time upon receiving the fast-forwarding/fast-reversing status according to the predetermined fast-forward/fast-backward strategy. It ensures that the first real-time playing progress displayed on the display interface of the mobile device synchronizes with the current playing progress of the current playing media file of the playing device 500.

The predetermined fast-forward/fast-backward strategy is, in at least one embodiment, to skip once every five seconds, to skip once every ten seconds, to skip once every thirty seconds, etc.

In at least one embodiment, after the first receiving unit 401 displays the real-time playing progress periodically calculated by the first calculating unit 403 on the display interface, the mobile terminal 400 further includes a sixth receiving unit 414 and a fourth sending unit 415. The sixth receiving unit 414 is configured to cause the processor 603 to receive the previous/next file command. The fourth sending unit 415 is configured to cause the processor 603 to send the playing command of playing the previous/next media file to the playing device 500. It makes sure that the playing device 500 plays the previous/next media file in response to the playing command.

It is understood that all of the function units of the mobile terminal 400 can be realized according to the method proposed by this embodiment. The realization refers to the description of this embodiment, and no details are provided here.

As can be seen from the above, the first receiving unit 401 receives the parameter information. The parameter information includes a current playing progress and a total time length of the current playing media file of the playing device 500. The first timing unit 402 is configured to cause the processor 603 to start to count time upon receiving the parameter information by the first receiving unit 401. The first calculating unit 403 is configured to cause the processor 603 to periodically calculate the real-time playing progress of the media file based by a predetermined time interval according to the parameter information and the timing information. The first display unit 404 is configured to cause the processor 603 to display the real-time playing progress periodically calculated by the first calculating unit 403 on the display interface. In this way, unstable data transmission is solved, and the accuracy of displaying progress of playing device 500 is improved as well.

Please refer to FIG. 7. FIG. 7 is a block diagram of a playing device 500 according to the first embodiment of the present disclosure.

The playing device 500 includes a processor 530 and a memory 520 electrically connected to the processor 530. A plurality of program instructions stored in the memory 520 are executable by the processor 530 to cause the processor 530 to perform corresponding functions. The plurality of program instructions include a first transmitting unit 501 which is configured to cause the processor 530 to send the parameter information to the N mobile terminals so that the N mobile terminals start to count time upon receiving the parameter information, periodically calculate the first real-time playing progress of the media file by the predetermined time interval according to the parameter information and the timing information, and display the real-time playing progress on the display interface.

The parameter information includes the current playing progress and the total time length of the current playing media file of the playing device. N represents an integer larger than or equal to one.

The predetermined time interval is set as 30 milliseconds (ms), 50 milliseconds, one second (s), two seconds, or other values.

In at least one embodiment, before the transmitting unit 501 sends the parameter information to the N mobile terminals, the playing device 500 further includes a first acquiring unit 502 and a second transmitting unit 503. The first acquiring unit 502 is configured to cause the processor 530 to receive connection requests from the N mobile terminals. The second transmitting unit 503 is configured to cause the processor 530 to send a complete response to the N mobile terminals, after connections between the N mobile terminals and the playing device in response to the connection requests are established.

In at least one embodiment, after the transmitting unit 501 sends the parameter information to the N mobile terminals, the playing device 500 further includes a second acquiring unit 504 and a pause unit 505. The second acquiring unit 504 is configured to cause the processor 530 to receive a pause command of stopping playing the media file from one of the N mobile terminals. The pause unit 505 is configured to cause the processor 530 to stop playing the media file in response to the pause command received by the second acquiring unit.

In at least one embodiment, after the pause unit 505 stops playing the media file in response to the pause command received by the second acquiring unit 504, the playing device 500 further includes a third transmitting unit 506 configured to cause the processor 530 to send the pause playing status of the media file to the N mobile terminals. Therefore, the N mobile terminals 400 can stop counting time upon receiving the pause playing status to ensure that the first real-time playing progress displayed on the display interface of the mobile device 400 synchronizes with the current playing progress of the current playing media file of the playing device 500.

In at least one embodiment, after the transmitting unit 501 sends the parameter information to the N mobile terminals, the playing device 500 further includes a third acquiring unit 507 and a fast-forwarding/fast-reversing unit 508. The third acquiring unit is configured to cause the processor 530 to receive the fast-forward/fast-backward command of fast-forwarding/fast-reversing the media file from one of the N mobile terminals 400. The fast-forwarding/fast-reversing unit 508 is configured to cause the processor 530 to play the media file according to the predetermined fast-forward/fast-backward strategy in response to the fast-forward/fast-backward command received by the third acquiring unit 507.

In at least one embodiment, after the fast-forwarding/fast-reversing unit 508 plays the media file in response to the fast-forward/fast-backward command received by the third acquiring unit 507 according to the predetermined fast-forward/fast-backward strategy, the playing device 500 further includes a fourth transmitting unit 509. The fourth transmitting unit 508 is configured to cause the processor 530 to send the fast-forwarding/fast-reversing status of the media file to the N mobile terminals 400 so that the N mobile terminals 400 can start to count time upon receiving the fast-forwarding/fast-reversing status according to the predetermined fast-forward/fast-backward strategy to ensure that the first real-time playing progress displayed on the display interface of the mobile device 400 synchronizes with the current playing progress of the current playing media file of the playing device 500.

The predetermined fast-forward/fast-backward strategy is, in at least one embodiment, to skip once every five seconds, to skip once every ten seconds, to skip once every thirty seconds, etc.

In at least one embodiment, after the transmitting unit 501 sends the parameter information to the N mobile terminals, the playing device 500 further includes a fourth acquiring unit 510 and a playing unit 512. The fourth acquiring unit 510 is configured to cause the processor 530 to receive a playing command of playing the previous/next media file from one of the N mobile terminals. The playing unit 511 is configured to cause the processor 530 to play the previous/next media file in response to the playing command received by the fourth acquiring unit 510.

It is understood that all of the function modules of the playing device 500 can be realized according to the method proposed by this embodiment. The realization refers to the description of this embodiment, and no details are provided herein.

As can be seen from the above, the transmitting unit 501 sends the parameter information to the N mobile terminals in this embodiment of the present disclosure so that the N mobile terminals 400 can start to count time upon receiving the parameter information, calculate the first real-time playing progress of the media file based on the predetermined time interval according to the parameter information and the timing information, and display the real-time playing progress on the display interface. The parameter information includes the current playing progress and the total time length of the current playing media file of the playing device. N represents an integer larger than or equal to one. As a result, unstable data transmission is solved, and the accuracy of displaying progress of playing device 500 is improved.

Figure 8:
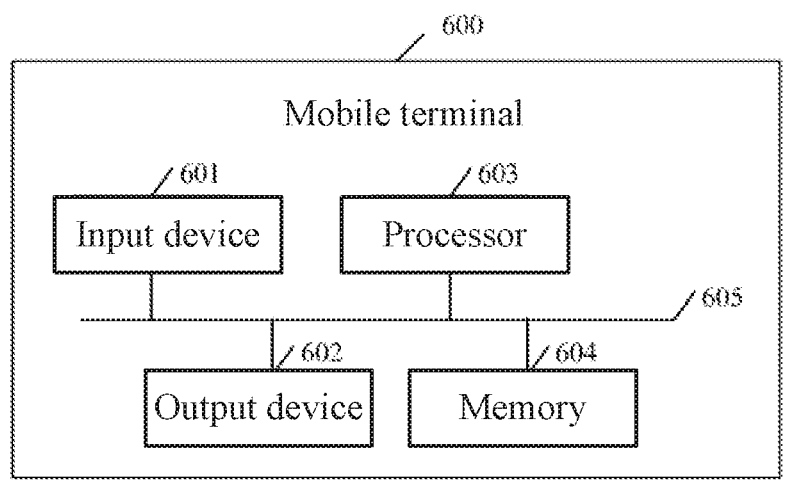
FIG. 8 is a block diagram of a mobile terminal according to an alternative embodiment of the present disclosure.

Please refer to FIG. 8. FIG. 8 is a block diagram of a mobile terminal 600 according to the embodiment of the present disclosure. The mobile terminal 600 includes one or more input devices 601, one or more output devices 602, one or more processors 603, such as a central processing unit (CPU), and a memory 604. The input device 601, the output device 602, the processor 603, and the memory 604 are connected through a bus 605. The memory 604 stores the plurality of program instructions executable by the processors 603 as provided in FIG. 6.

Specifically, the input device 601 is a touch panel of the mobile terminal. The input device 601 includes a touch screen and a touch monitor. The input device 601 is configured to sense operational commands on the touch panel of the mobile terminal.

Specifically, the output device 602 is a display panel of the mobile terminal. The output device 602 is configured to output and displaying information.

The memory 604 can be a high-speed random access memory (RAM) memory and an unstable non-volatile memory such as a magnetic disc storage. The memory 604 is configured to store a set of source code, the input device 601, the output device 602, and the processor 603. The processor 603 is configured to call the set of source code stored in the memory 604. The operation of the memory 604 is described as follows:

The input device 601 is configured to receive the parameter information from the playing device. The parameter information includes the current playing progress and the total time length of the current playing media file of the playing device.

The processor 603 is configured to start to count time upon receiving the parameter information and periodically calculating the real-time playing progress of the media file by the predetermined time interval according to the parameter information and the timing information.

The predetermined time interval is set as 30 milliseconds (ms), 50 milliseconds, one second (s), two seconds, or other values.

The output device 602 is configured to display the real-time playing progress on the display interface.

In other embodiments, before the input device 601 receives the parameter information from the playing device, the output device 602 is further configured to send a complete response, indicating a completion of a connection between the playing device and the mobile terminal, to the mobile terminal in response to the connection request sent from the playing device to the mobile terminal.

In other embodiments, after the output device 602 displays the real-time playing progress on the display interface, the input device 601 is further configured to receive the pause command.

The output device 602 is further configured to send the pause command of stopping playing the media file to the playing device so that the playing device can stop playing the media file in response to the pause command.

In other embodiments, after the output device 602 sends the pause command of stopping playing the media file to the playing device, the output device 602 is further configured to receive the pause playing status of the media file from the playing device.

The processor 603 is further configured to stop counting time upon receiving the pause playing status to ensure that the first real-time playing progress displayed on the display interface of the mobile device synchronizes with the current playing progress of the current playing media file of the playing device.

In other embodiments, after the input device 601 displays the real-time playing progress on the display interface, the input device 601 is further configured to receive the fast-forward/fast-backward command.

The output device 602 is further configured to send the fast-forward/fast-backward command of fast-forwarding/fast-reversing the media file to the playing device so that the playing device can play the media file according to the predetermined fast-forward/fast-backward strategy in response to the fast-forward/fast-backward command.

The predetermined fast-forward/fast-backward strategy is, in at least one embodiment, to skip once every five seconds, to skip once every ten seconds, to skip once every thirty seconds, etc.

In other embodiments, after the output device 602 sends the fast-forward/fast-backward command of fast-forwarding/fast-reversing the media file to the playing device, the input device 601 is further configured to receive the fast-forwarding/fast-reversing status of the media file sent from the playing device.

The processor 603 is further configured to count time upon receiving the fast-forwarding/fast-reversing status according to the predetermined fast-forward/fast-backward strategy to ensure that the first real-time playing progress displayed on the display interface of the mobile device synchronizes with the current playing progress of the current playing media file of the playing device.

In other embodiments, after the output device 602 displays the real-time playing progress on the display interface, the input device 601 is further configured to receive the previous/next file command.

The output device 602 is further configured to send the playing command of playing the previous/next media file to the playing device so that the playing device can play the previous/next media file in response to the playing command of playing the previous/next media file.

The input device 601, the output device 602, and the processor 603 perform their functions well according to the descriptions about the method of synchronously playing media file in each of the embodiments and according to the description about the mobile terminal in the first embodiment. The detail will not be repeated here.

The units proposed by all of the embodiments are realized through the universal integrated circuit, such as a central processing unit (CPU), or the application specific integrated circuit (ASIC).

The order of the blocks of the method proposed this embodiment can be adjusted, combined, or deleted if needed.

The modules or unit of the device proposed this embodiment can be combined, divided, or deleted if needed.

One having ordinary skill in the art understands that all or some of the procedures introduced in the above-mentioned embodiments are performed through computer programs which command relevant hardware. All of the programs are stored in a computer-readable storage medium. The programs in operation include all of the procedures introduced in the above-mentioned embodiments. The storage medium is a diskette, a compact disc, a read-only memory (ROM), or a random access memory (RAM).

While the present disclosure has been described in connection with what is considered the most practical and preferred embodiments, it is understood that this disclosure is not limited to the disclosed embodiments but is intended to cover various arrangements made without departing from the scope of the broadest interpretation of the appended claims.

What is claimed is:

1. A method of synchronizing a playing progress of a media file between a plurality of mobile terminals, comprising:

receiving, by each of the plurality of mobile terminals, parameter information from a playing device, wherein the playing device is configured to play the media file, and the parameter information comprises a current playing progress and a total time length of a current playing media file;

starting to count time, with each of the plurality of mobile terminals, upon receiving the parameter information, and calculating a real-time playing progress of the media file based on a predetermined time interval according to the parameter information and timing information, wherein the real-time playing progress of the media file is periodically calculated based on the current playing progress of the current playing media file and the predetermined time interval;

displaying, on a display interface of each of the plurality of mobile terminals, the real-time playing progress;

receiving by one of the plurality of mobile terminals, a pause command;

sending with the one of the plurality of mobile terminals, the pause command of stopping playing the media file to the playing device, such that the playing device stops playing the media file in response to the pause command;

receiving, by the one of the plurality of mobile terminals, a pause playing status of the media file from the playing device; and sending, with the one of the plurality of mobile terminals, the pause playing status to a remainder of the plurality of mobile terminals, such that each of the plurality of mobile terminals stops counting time upon receiving the pause playing status, to ensure a first real-time playing progress displaying on the display interface of each of the plurality of mobile terminals is synchronized with the current playing progress of the current playing media file of the playing device.

2. The method of claim 1, wherein before receiving parameter information from the playing device, the method further comprises:

sending, with each of the plurality of mobile terminals, a connection request to the playing device so that the playing device sends a complete response, indicating a completion of a connection between the playing device and each of the plurality of mobile terminals, to the mobile terminal in response to the connection request sent from the playing device to the mobile terminal.

3. The method of claim 1, wherein after displaying, the real-time playing progress, the method further comprises:

receiving, by the one of the mobile terminals, a fast-forward/fast-backward command; and sending, with the one of the mobile terminals, the fast-forward/fast-backward command of fast-forwarding/fast-reversing the media file to the playing device so that the playing device plays the media file according to a predetermined fast-forward/fast-backward strategy in response to the fast-forward/fast-backward command.

4. The method of claim 3, wherein after sending the fast-forward/fast-backward command of fast-forwarding/fast-reversing the media file to the playing device, the method further comprises:

receiving, by each of the plurality of mobile terminals, a fast-forwarding/fast-reversing status of the media file from the playing device; and starting to count time, with each of the plurality of mobile terminals, upon receiving the fast-forwarding/fast-reversing status according to the predetermined fast-forward/fast-backward strategy to ensure that a first real-time playing progress displayed on the display interface of each of the plurality of mobile terminals synchronizes with the current playing progress of the current playing media file of the playing device.

5. The method of claim 1, wherein after displaying the real-time playing progress, the method further comprises:

receiving, by the one of the mobile terminals, a previous/next file command; and sending, with the one of the mobile terminals, a playing command of playing a previous/next media file to the playing device so that the playing device plays the previous/next media file in response to the playing command of playing the previous/next media file.

6. The method of claim 1, wherein receiving the parameter information from the playing device comprises:

sending, by each of the plurality of mobile terminals, a request for acquiring the parameter information to the playing device; and receiving, by each of the plurality of mobile terminals, the parameter information sent by the playing device in response to the request.

7. The method of claim 1, wherein the playing device and the plurality of mobile terminals communicate with each other over a local area network.

8. A mobile terminal system for synchronizing a playing progress of a media file between a plurality of mobile terminals, comprising:

a plurality of mobile terminals, each mobile terminal comprising:

a processor;

a memory; and one or more program instructions, stored in the memory and executable by the processor, the one or more program instructions;

wherein each of the plurality of mobile terminals is configured to:

receive parameter information from a playing device, the parameter information comprising a current playing progress and a total time length of a current playing media file;

start to count time, upon receiving the parameter information;

calculate a real-time playing progress of the media file based on a predetermined time interval according to the parameter information and timing information, the real-time playing progress of the media file being periodically calculated based on the current playing progress of the current playing media file and the predetermined time interval; and display the real-time playing progress on a display interface of each of the plurality of mobile terminals;

wherein one of the plurality of mobile terminals is configured to:

receive a pause command;

send the pause command of stopping playing the media file to the playing device, such that the playing device stops playing the media file in response to the pause command;

receive a pause playing status of the media file from the playing device; and send the pause playing status to remaining of the plurality of mobile terminals, such that each of the plurality of mobile terminals stops counting time upon receiving the pause playing status, to ensure a first real-time playing progress calculated by each terminal device is synchronized with the current playing progress of the current playing media file of the playing device.

9. The mobile terminal system of claim 8 wherein each of the plurality of mobile terminals are further configured to:

send a connection request to the playing device, so that the playing device sends a complete response indicating a completion of a connection between the playing device and each of the plurality of mobile terminals to the each of the plurality of mobile terminals in response to the connection request sent from the playing device to the each of the plurality of mobile terminals.

10. The mobile terminal system of claim 8 wherein the one of the plurality of mobile terminals is further configured to:

receive a fast-forward/fast-backward command; and send the fast-forward/fast-backward command of fast-forwarding/fast-reversing the media file to the playing device, so that the playing device plays the media file according to a predetermined fast-forward/fast-backward strategy in response to the fast-forward/fast-backward command.

11. The mobile terminal system of claim 10 wherein each of the plurality of mobile terminals are further configured to:

receive a fast-forwarding/fast-reversing status of the media file from the playing device; and start to count time upon receiving the fast-forwarding/fast-reversing status according to the predetermined fast-forward/fast-backward strategy, so that a first real-time playing progress displayed on the display interface of each of the plurality of mobile terminals synchronizes with the current playing progress of the current playing media file of the playing device.

12. The mobile terminal system of claim 8 wherein the one of the plurality of mobile terminals is further configured to:

receive a previous/next file command; and send a playing command of playing the previous/next media file to the playing device, so that the playing device plays the previous/next media file in response to the playing command.

13. The system of claim 8, wherein each of the plurality of mobile terminals is further configured to:

send a request for acquiring the parameter information to the playing device; and receive the parameter information sent by the playing device in response to the request.

14. The system of claim 8, wherein the plurality of mobile terminals are configured to transmit and receive information over a local area network.

15. A playing device for playing a media file comprising:

a processor;

a memory; and one or more program instructions, stored in the memory and executable by the processor, wherein when the one or more program instructions are executed by the processor, the processor is configured to:

send parameter information to each of N mobile terminals in a local area network corresponding to the playing device, so that each of the N mobile terminals start to count time upon receiving the parameter information, periodically calculate a first real-time playing progress of the media file by a predetermined time interval according to the parameter information and the timing information, and display real-time playing progress on a display interface, wherein the first real-time playing progress of the media file is periodically calculated based on the current playing progress of the current playing media file and the predetermined time interval;

receive a pause command to stop playing the media file from one of the N mobile terminals;

stop playing the media file in response to the pause command; and send a pause playing status of the media file to the one of the N mobile terminals, so that the one of N mobile terminals sends the pause playing status of the media file to remaining of the N mobile terminals, and each of the N mobile terminals stops counting time upon receiving the pause playing status to ensure that the first real-time playing progress displayed on display interface of each of the N mobile devices synchronizes with the current playing progress of the current playing media file of the playing device;

wherein the parameter information comprises a current playing progress and a total time length of a current playing media file of the playing device, and N represents an integer larger than or equal to two.

16. The playing device of claim 15 wherein the processor is further configured to:

receive connection requests from each of the N mobile terminals; and send a complete response to each of the N mobile terminals, after connections between each of the N mobile terminals and the playing device in response to the connection requests are established.

17. The playing device of claim 15, wherein the processor is further configured to:

receive a fast-forward/fast-backward command of fast-forwarding/fast-reversing the media file from the one of the N mobile terminals; and play the media file according to a predetermined fast-forward/fast-backward strategy in response to the fast-forward/fast-backward command.

18. The playing device of claim 17, wherein the processor is further configured to:

send a fast-forwarding/fast-reversing status of the media file to each of the N mobile terminals, so that each of the N mobile terminals start to count time upon receiving the fast-forwarding/fast-reversing status according to the predetermined fast-forward/fast-backward strategy to ensure that the first real-time playing progress displayed on the display interface of each of the N mobile devices synchronizes with the current playing progress of the current playing media file of the playing device.

19. The playing device of claim 15, wherein the processor is further configured to:

receive a request for acquiring the parameter information from each of the N mobile terminals; and send the parameter information to each of the N mobile terminals in response to the request.

* * * * *